United States Patent [19]

Hug et al.

[11] Patent Number: 4,855,980
[45] Date of Patent: Aug. 8, 1989

[54] METHOD OF AND APPARATUS FOR STORING AND RETRIEVING INFORMATION CONTAINING DISC UTILIZING A MOVABLE MAGAZINE

[75] Inventors: Paul Hug, Saratoga; Bill Umeda, San Jose; Paul A. Yesnosky, Sunnyvale; Bart Raudebaugh, Sunnyvale; Gary Ricco, Sunnyvale; Gary E. McCabe, San Jose, all of Calif.

[73] Assignee: Cygnet Systems, Sunnyvale, Calif.

[21] Appl. No.: 133,008

[22] Filed: Dec. 15, 1987

[51] Int. Cl.⁴ .......................... G11B 19/00; G11B 5/48
[52] U.S. Cl. .................................... 369/36; 360/98.01; 360/98.06; 369/39
[58] Field of Search .................. 369/34, 36, 37, 38, 369/39, 98.01, 98.06, 99.02, 99.03, 99.06, 99.07

[56] References Cited

U.S. PATENT DOCUMENTS

| | | | |
|---|---|---|---|
| 4,502,133 | 2/1985 | Siryj et al. | 369/38 |
| 4,652,939 | 3/1987 | Baumeister | 369/38 |
| 4,685,095 | 8/1987 | Rudy et al. | 369/36 |

Primary Examiner—Steven L. Stephan
Attorney, Agent, or Firm—Flehr, Hohbach, Test, Albritton & Herbert

[57] ABSTRACT

A technique for storing and retrieving information containing discs utilizing a movable disc storage magazine is disclosed herein. The disc storage magazine, which is designed to store a plurality of information containing discs in individual compartments, is movable along a predetermined path which passes through a specific disc storage station such that each of the individual compartments is positionable within that station. At the same time, a disc drive for storing information on and retrieving information from the discs is located at a disc drive station spaced from the disc storage station. Means are provided for moving the disc storage magazine in a way which places a desired magazine compartment at the disc storage station and means are provided for transferring an information containing disc between that compartment and the disc drive station.

30 Claims, 9 Drawing Sheets

METHOD OF AND APPARATUS FOR STORING AND RETRIEVING INFORMATION CONTAINING DISC UTILIZING A MOVABLE MAGAZINE

The present invention relates generally to techniques for storing and retrieving information containing media and more particularly to a specifically designed apparatus which is especially suitable for storing and retrieving information containing discs, specifically a relatively small 5¼" floppy discs.

There are many different arrangements for storing and retrieving information containing media. Examples of these arrangements, or "jukeboxes" as they are often called, may be found in U.S. Pat. Nos. 4,271,489 (RCA) 4,608,679 (Filenet), and 4,527,262 (Manto). In each of these patents, the particular arrangement illustrated there utilizes a fixed storage area or magazine for storing information containing discs, a spaced apart disc drive and some sort of carriage mechanism for transferring discs between the storage magazine and drive. In each of these arrangements, in order to retrieve or store a given disc in a specific storage compartment, the carriage mechanism must be moved to that particular compartment.

As will be described in detail hereinafter, applicants have taken an entirely different approach in which their transfer mechanism is not required to move from one storage compartment to another in transferring specific discs between their storage magazine and disc drive. Rather, the storage magazine is moved so that its associated transfer mechanism need only move between a fixed storage station and a drive station. Applicants believe that this approach provides for a more rapid and reliable disc storage and retrieval apparatus, especially for use with relatively small discs such as the 5¼" floppy discs.

In view of the foregoing, it is an object of the present invention to provide a rapid and reliable apparatus for and method of storing and retrieving information containing discs.

A more specific object of the present invention is to provide a disc storage and retrieval apparatus including a unique disc storage magazine.

Another specific object of the present invention is to provide a disc storage and retrieval apparatus including a unique arrangement for transferring discs between its disc storage magazine and a cooperating disc drive.

Still another specific object of the present invention is to provide a transfer arrangement including unique carriage assemblies for picking up discs from and delivering them to the disc storage magazine and disc drive.

As will be described in more detail hereinafter, the storage and retrieval technique disclosed herein stores information containing discs in individual compartments within a disc storage magazine which is movable along a predetermined path through a specific disc storage station such that each of the individual compartments is positionable within the disc storage station. A disc drive for storing information onto and retrieving information from the discs is located at a disc drive station spaced from the disc storage station. In accordance with the present invention, means are provided for moving the disc storage magazine along its predetermined path so as to place a specific magazine compartment containing a desired disc in the disc storage station. Once the desired disc moves into the disc storage station, it can be transferred by a cooperating transfer arrangement to the disc drive at its adjacent disc drive station.

In an actual working embodiment of the present invention, the transfer arrangement is configured to transfer a disc from a magazine compartment at the disc storage station to the disc drive while simultaneously transferring a disc from the drive to the magazine compartment at the disc storage station. In this same actual working embodiment, each disc is supported for movement between the magazine and disc drive along a circular transfer path in a carriage arrangement which is also designed in accordance with the present invention. Each of these carriage arrangements picks up and delivers a disc in a specific way to be described hereinafter and can be rotated in a controlled way for delivering its disc to the disc drive so as to place either side of the disc adjacent a given side of the drive, whereby information can be stored on and retrieved from either side of a two-sided disc using a drive having one sided storage and retrieval capabilities.

As indicated above, the present invention provides for a technique for storing and retrieving information containing discs. It is to be understood that the present invention is equally applicable for storing and retrieving other types of media containing information, for example, tapes. However, for purposes of convenience, the only type of media to be referred to herein are discs.

The present technique will be described in detail below in conjunction with the drawings wherein:

FIG. 1 diagramatically illustrates an apparatus for storing and retrieving information containing discs which apparatus is designed in accordance with the present invention and which includes a movable magazine for storing the discs, (2) a drive unit for storing information on and retrieving information from discs, and (3) a transfer arrangement for moving discs between the movable magazine and drive unit;

FIGS. 2-5 diagramatically illustrate certain operating features of the movable magazine and transfer arrangement forming part of the apparatus illustrates in FIG. 1;

Figure 9:
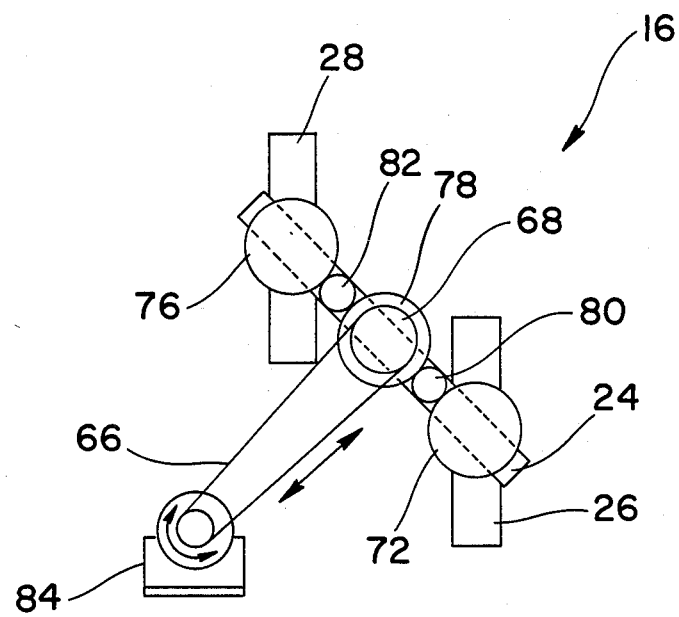
FIG. 9 is a front elevational view, in partial diagramatic illustration, of the transfer arrangement forming part of the overall apparatus of FIG. 1.
Figure 10:
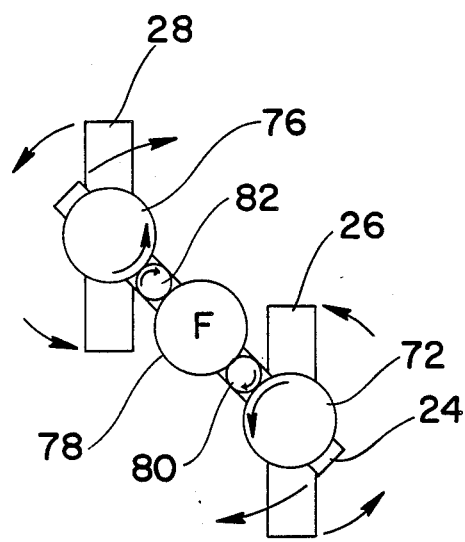
FIG. 10 is a side elevational view of the transfer arrangement shown in FIG. 9.
Figure 11:
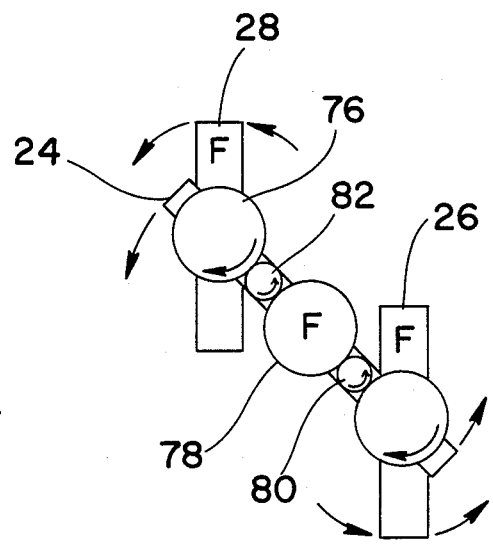
Figure 12:
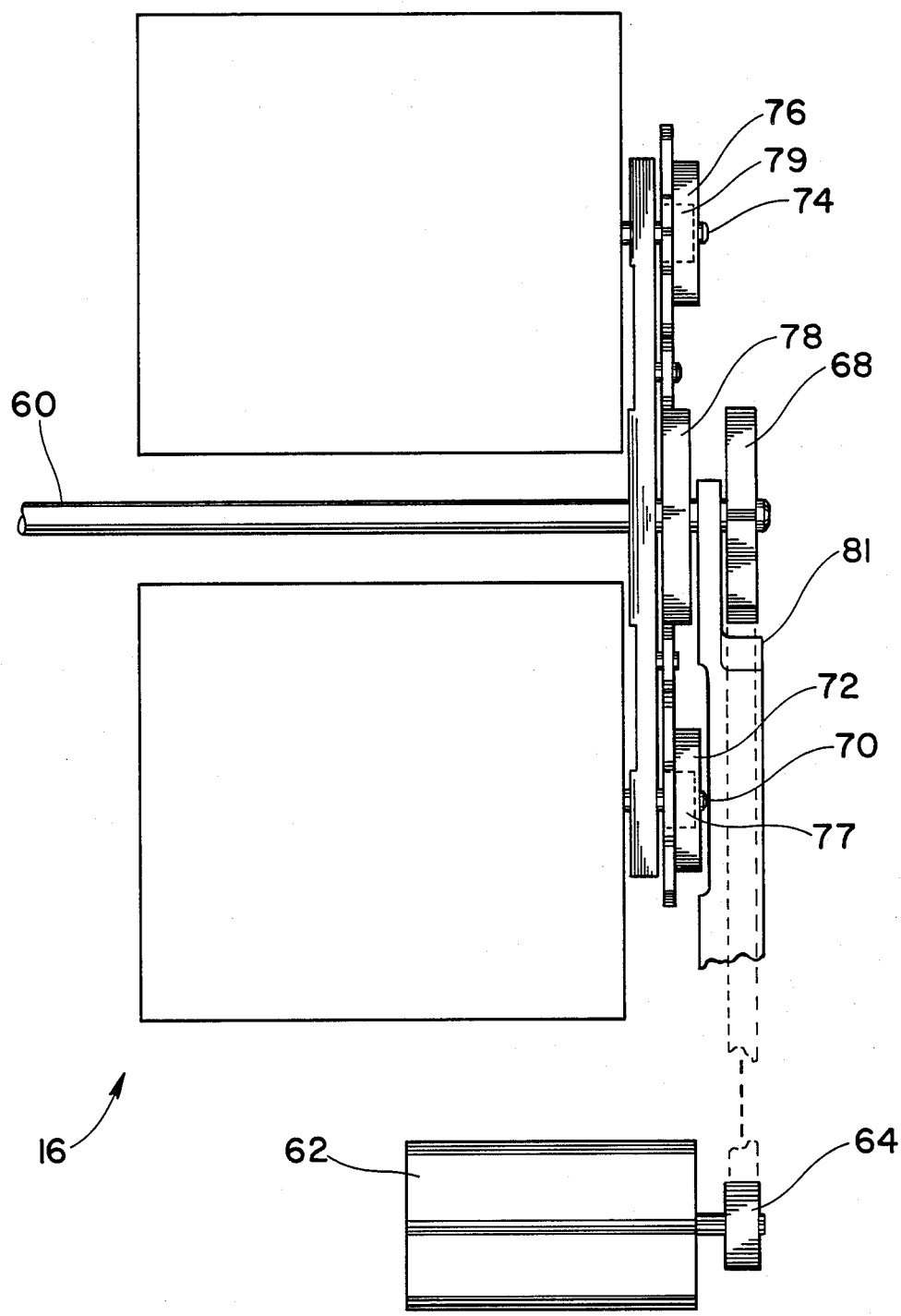

FIG. 11 and 12 diagrammatically illustrate certain specific operating features of the transfer arrangement of FIGS. 9 and 10.

Figure 13:
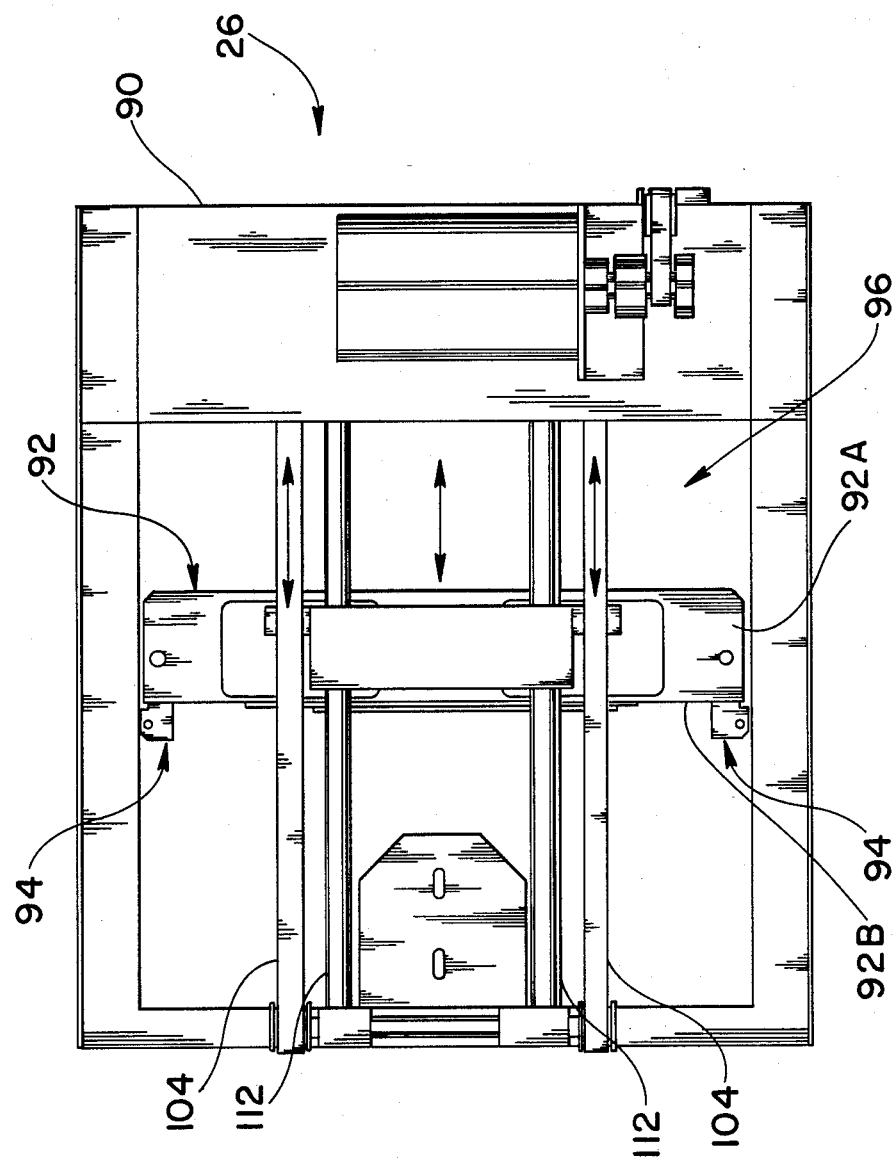
Figure 14:
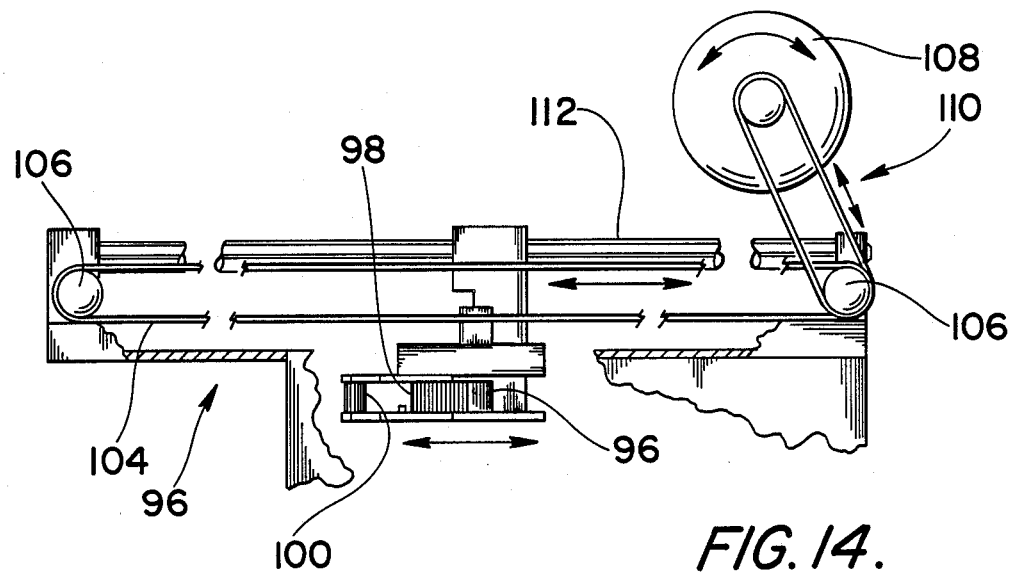
Figure 15:
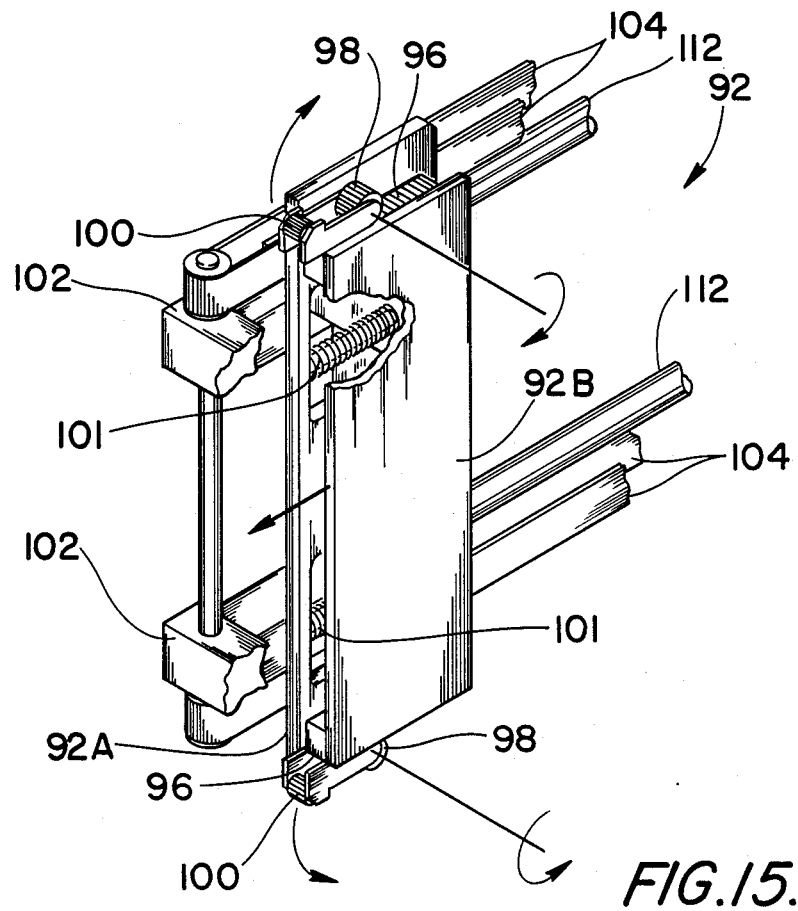
Figure 16:
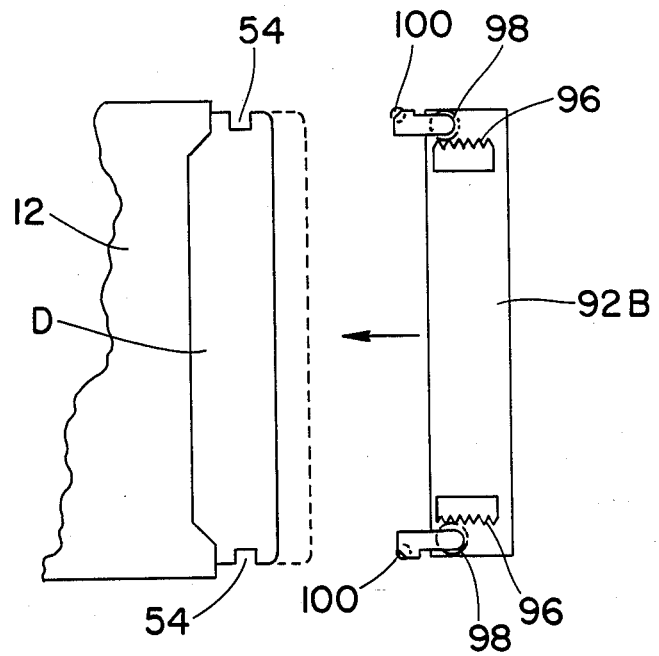
Figure 17:
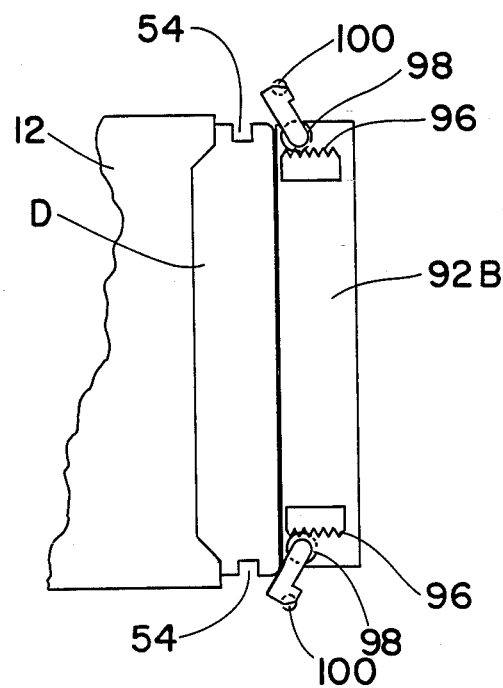
Figure 18:
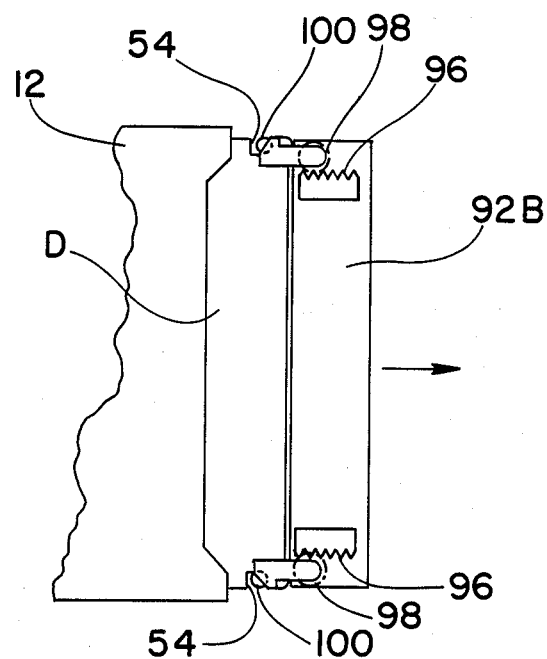

FIG. 13 is a side elevational view of one of two transfer carriages forming part of the overall transfer arrangement of FIGS. 9 and 10;

FIG. 14 is a plan view of the transfer carriage of FIG. 13;

FIG. 15 is a prospective view of parts of the transfer carriage of FIGS. 13 and 14; and FIGS. 16-18 diagrammatically illustrate certain specific operating features of the transfer carriage of FIGS. 13-15.

Figure 1:
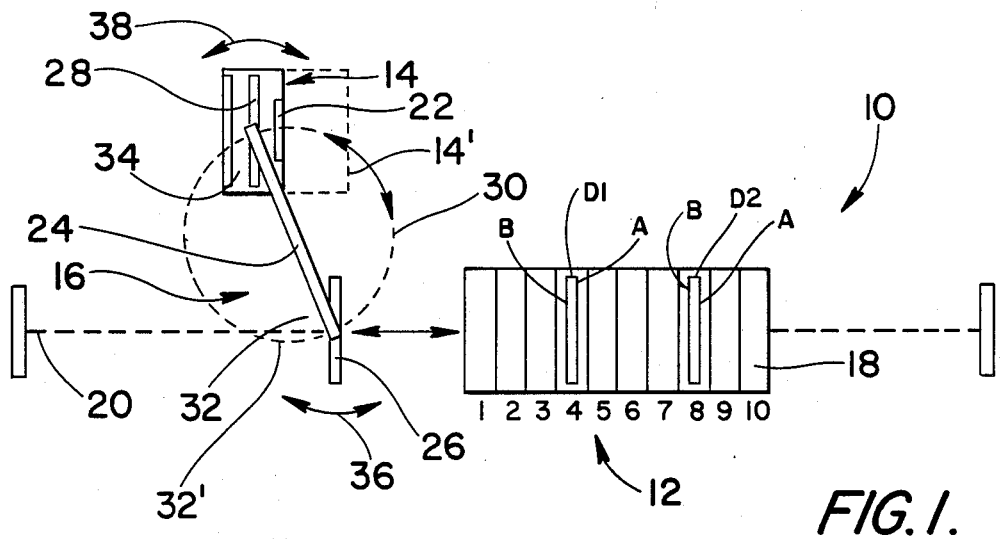
Figure 19:
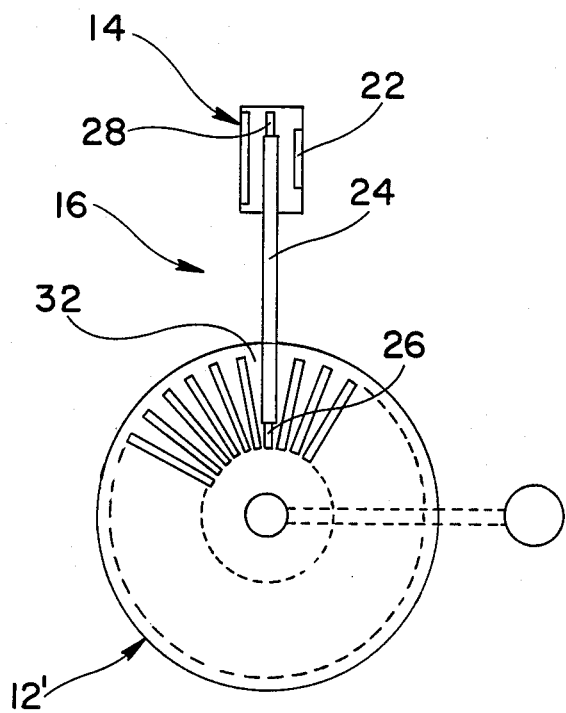

FIG. 19 diagrammatically illustrates an apparatus corresponding in function to the apparatus shown in FIG. 1 but with a modified magazine.

Turning now to the drawings, wherein like components are designated by like reference numerals throughout the various figures, attention is first directed to FIG. 1 which illustrates an apparatus designed in accordance with the prevent invention for storing and retrieving information containing discs. The apparatus, which is generally designed by the reference numeral 10, includes a disc storage magazine 12, a disc drive unit 14 and a transfer arrangement 16. As will be seen below, magazine 12 serves to store information containing discs, drive unit 14 serves to store information on and retrieve information from the discs, and transfer arrangement 16 serves to move the discs between the storage magazine and the drive unit.

Still referring to FIG. 1, storage magazine 12 is shown including individual, vertically extending compartments 18 (which are numbered 1-10 for purposes of discussion) for storing information containing discs D, two of which are designated D1 and D2 in compartments 4 and 8. These vertical compartments are disposed adjacent one another in a straight line and, in accordance with the present invention, the entire magazine is movable along a predetermined straight line path generally indicated by dotted lines at 20. The information containing discs may be of any known type, for example 5¼" magnetic floppy discs. However, they could be optical discs or other types of information bearing media, so long as the drive unit 14 is compatible; that is, so long as the drive unit is able to retrieve information from the media, and preferably, also store information onto the media, although this is not essential. For purposes of convenience, it will be assumed that apparatus 10 utilizes standard information containing computer discs and that the disc drive 14 is a conventional, readily providable device for storing information onto and retrieving information from such discs. In addition, while in fact the discs contemplated include their own cartridge housings, as will be seen hereinafter, they will nevertheless merely be referred to as discs, without reference to their cartridge housings, unless pertinent to the description.

As just stated, drive unit 14 is conventional and readily providable. This device does not per se form part of the present invention. It must at least be capable of retrieving (reading) information contained on discs D and preferably is capable of storing (writing) information onto the discs. In addition, while the drive unit may be of the type which is able to read and write on both sides of the disc, in an actual working embodiment, the drive unit used includes only one read/write head and is able to read and write on one side of the disc only. Drive unite 14 is of that type, and, as shown, extends vertically and includes a single read/write head diagrammatically illustrated at 22.

As stated above, transfer arrangement 16 serves to transfer discs D between magazine 12 and drive unit 14. The transfer arrangement is diagrammatically shown including an elongated transfer arm 24 which supports disc transfer carriages 26 and 28 at opposite ends thereof and which is mounted for rotation about a perpendicular axis through its center such that the transfer carriages move along a common circular transfer path 30 indicated by dotted lines. The transfer path passes through a disc storage station 32 which also lies on storage magazine path 20 and it also passes through a disc drive station 34 adjacent disc drive unit 14. Thus, transfer arm 24 is rotatable about circular path 30 so as to move each of the carriages 26 and 28 between storage station 32 and drive station 34. For reasons to be discussed hereinafter, each of the carriages 32 and 34 is rotatable relative to transfer arm 24 in a controlled way about an axis parallel to the axis of rotation of the transfer arm, as indicated by arrows 36 and 38.

It is to be understood that overall apparatus 10 has only been partially described thus far so that its overall operation can be explained. A more detailed description will follow. This detailed description will include, among other features, means for moving magazine 12 in a controlled way along magazine path 20 so as to place any one of the magazine compartments 1-10 at storage station 32. The detailed description will also include means for rotating transfer arm 24 about circular transfer axis 30 and means for rotating the carriages 26 and 28 about their own respective axes in a controlled way. It will also include the structural details of each carriage and the way in which the carriage picks up a disc from either magazine 12 or drive unit 14 and delivers it to the other.

Figure 2:
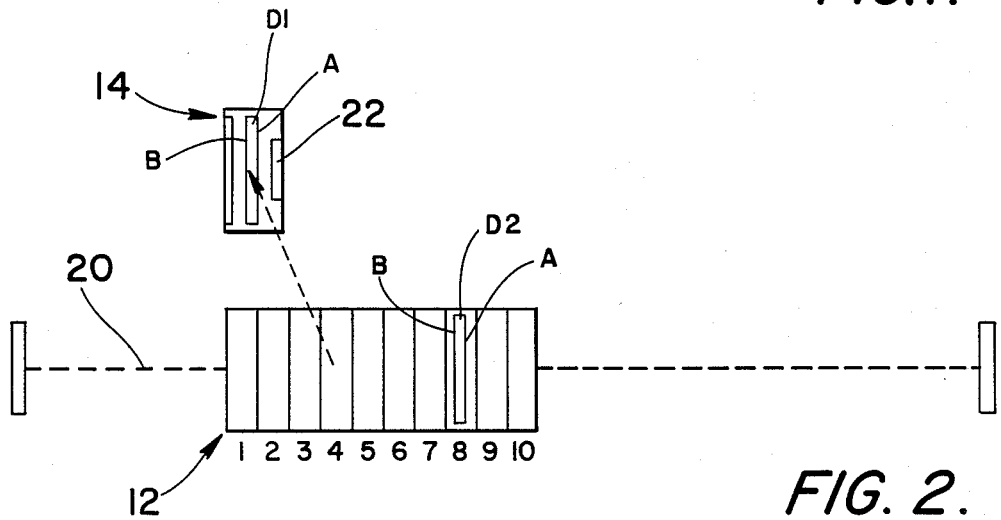
Figure 4:
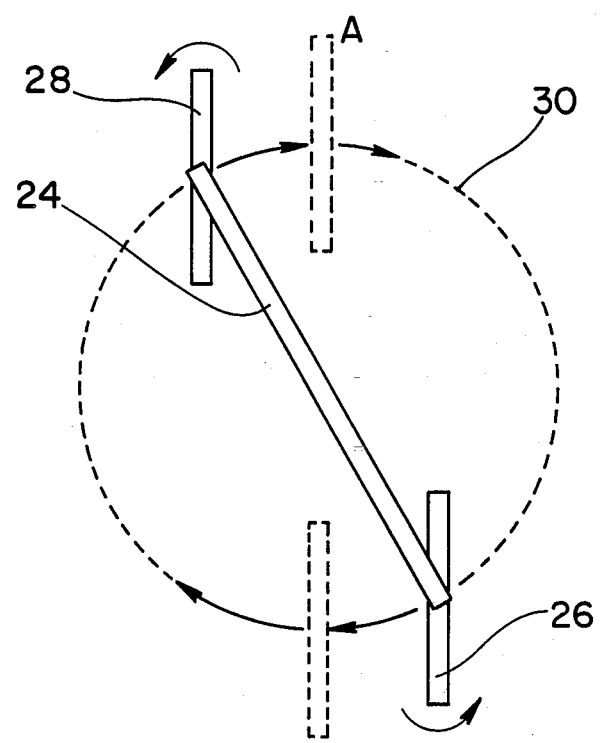

With the foregoing in mind, attention is now directed to the way in which overall apparatus 10 operates to transfer specifically selected discs between the storage magazine and drive unit. To this end, it will first be assumed the apparatus is in the operating position shown in FIG. 1 with disc D1 in compartment 4 and disc D2 in compartment 8. Note that the opposite sides of the discs have been designated as sides A and B. It will now be assumed that instructions have been given to apparatus by cooperating, readily providable computer means (not shown), for example a master computer, to transfer disc D1 to drive unit 14 so as to retrieve information from side A. In order to achieve that end, the magazine 12 is first caused to move from its FIG. 1 position to the left until compartment 4 is placed in disc storage station 32, as shown in FIG. 2. Thereafter, carriage 26 which is waiting at station 32 picks up disc D1 and transfer arm 24 is rotated 180°, as best illustrated diagrammatically in FIG. 4. Note that each of the carriages rotates in a specific way relative to transfer arm 24 (as will be described hereinafter) so that the carriage and disc D1 remain vertical. By moving the transfer arm and carriages in this way, carriage 26 moves into the disc drive station 34 while carriage 28 simultaneously moves into storage station 32, both in vertical positions. The carriage 28, places disc D1 into disc drive 14, as illustrated in FIG. 2. Note that side A of disc D1 is adjacent read/write head 22. This is because the disc remained vertical throughout the movement from the storage station to the drive station.

Figure 3:
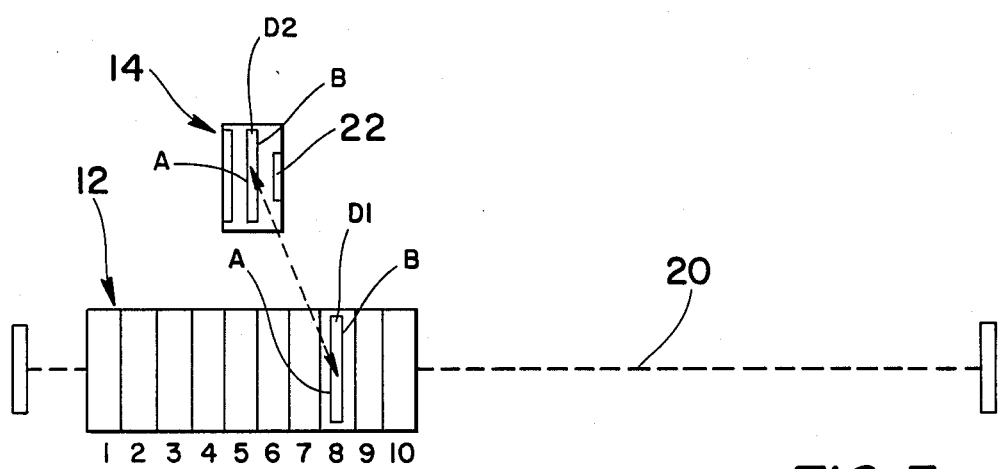
Figure 5:
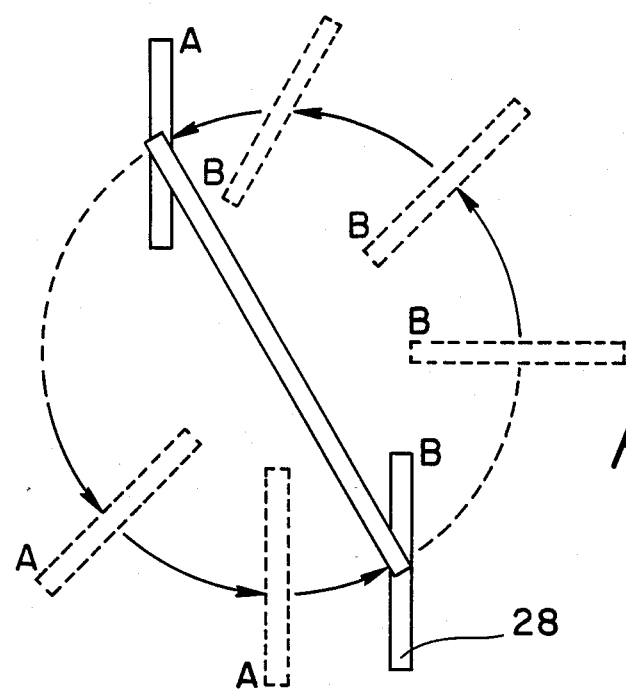

Still referring to the operation of overall apparatus 10, it will now be assumed the apparatus is to transfer disc D2 located in compartment 8 to disc drive 14 and that information on side B of that disc is to be retrieved. Upon receipt of these instructions by, for example, the master computer, the apparatus causes magazine 12 to move further to its left from its FIG. 2 position so as to place compartment 8 in storage station 32, as illustrated in FIG. 3. At this time, the carriage 28 picks up disc D2 from magazine compartment 8 while carriage 26 simultaneously picks up disc D1 from drive unit 14. The transfer arm is then again rotated 180° so as to return carriage 26 to storage station 32 while returning carriage 28 to drive station 34. As illustrated in FIG. 5, during this rotational movement, the carriages are caused to rotate in a way which turns them 180°. Thus, when carriage 28 reaches drive unit 14, it places the disc D2 into the drive unit so that its side B is adjacent read/- write head 22, as seen in FIG. 3. At the same time, carriage 26 places disc D1 into the now empty magazine compartment 8 with side B facing to the right and side A facing to the left, as viewed in FIG. 3. Overall apparatus includes suitable and readily providable means for monitoring the location of each disc at any given time. Thus, the master computer is told that disc D1 which previously was in magazine compartment 4 and then disc drive 14 is now in compartment 8 in its flipped position and disc D2 which was previously in compartment 8 is now in the disc drive.

From the foregoing, it can be seen that overall transfer arrangement 16 is only required to move between two stations. This is to be contrasted with those prior art arrangements illustrated in the above recited patents where the carriage arrangements move from one disc storage point to another in order to transfer the disc between those points and a drive unit.

Figure 6:
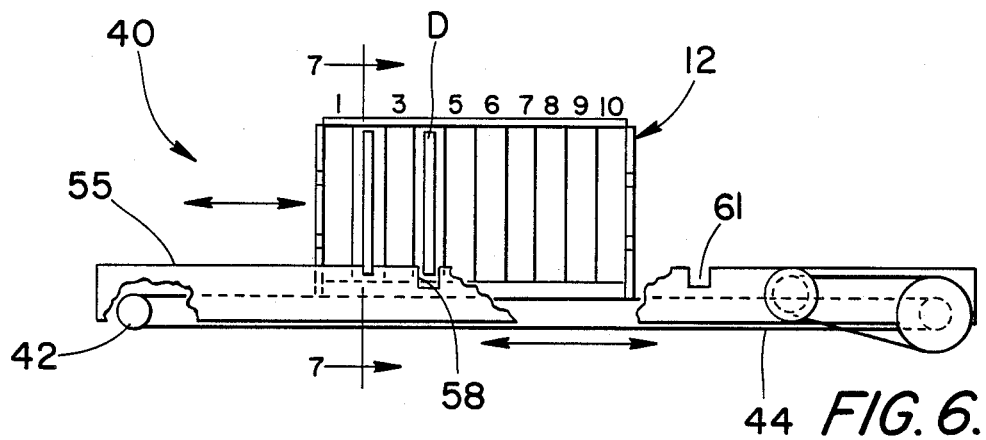
FIG. 6 is a partially broken away side elevational view of the movable disc storage magazine forming part of the overall apparatus of FIG. 1.

Having described overall apparatus 10 and its operation generally, attention is now directed to the structural details of the apparatus, starting with magazine 12. As illustrated best in FIGS. 6-8, this magazine actually forms part of an overall storage magazine assembly 40 which also includes, among other components to be described, a magazine drive arrangement 42. This arrangement includes a horizontally extending endless belt 44 supported at opposite ends by cooperating belt rollers 46 and 48. A drive motor 50 is suitable wired to and controlled by, for example, the previously recited master computer, is provided for driving belt 44 in a controlled manner through a suitable arrangement of gears and a belt generally indicated at 52. The underside of magazine 12 is fixedly connected to the top side of a section of endless belt 44, as best seen in FIG. 6. At the same time, the endless belt extends along an defines previously recited magazine path 20. In this way, by controlling the movement of endless belt 44, magazine 12 can be moved in a controlled way along magazine path 20 in order to perform the required movement described above so as to place any of the magazine compartments 1-10 in storage station 32. In order to insure that magazine 12 moves smoothly, it rides on a pair of rails 45 on opposite sides of belt 44.

Figure 7:
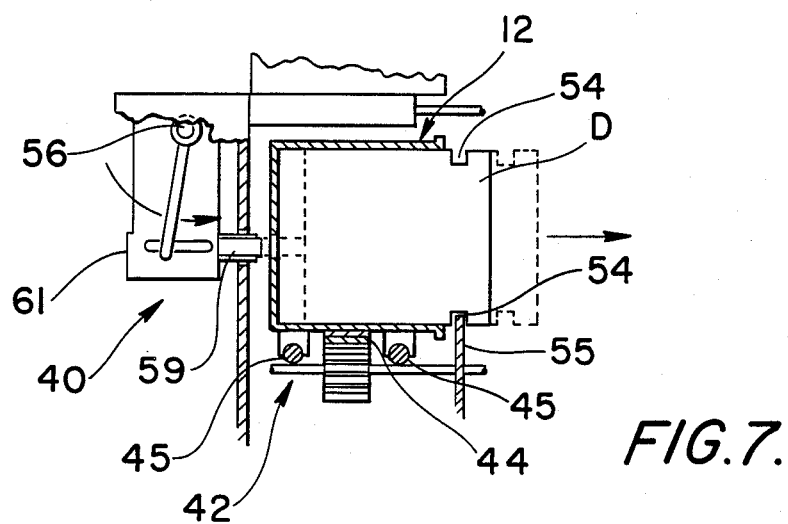
FIG. 7 is a cross sectional view of the magazine of FIG. 6, taken, generally along line 7—7 in FIG. 6.
Figure 8:
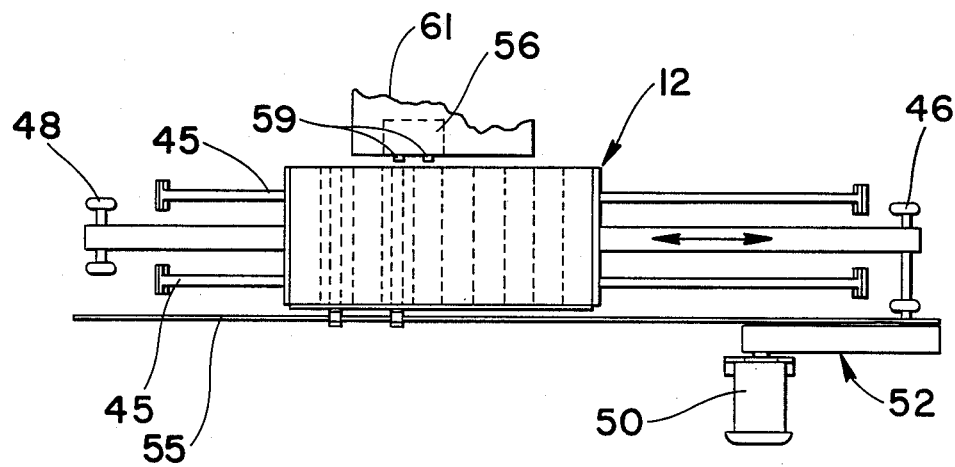
FIG. 8 is a plan view of the movable disc storage magazine of FIG. 6.

As best illustrated in FIG. 7, each disc D in each of the magazine compartments 1-10 extends out beyond the front face of the magazine and includes opposing slots 54 for reasons to be described hereinafter. In order to insure that the discs remain in their respective magazine compartments during movement of the magazine, overall assembly 40 includes horizontally extending plate member 55 located in front of the magazine and extending the entire length of path 20, as best illustrated in FIGS. 6 and 8. As best seen in FIG. 7, the plate extends through the bottom slot 54 in each disc of the magazine, with one exception. As seen in FIG. 6, plate member 55 includes its own slot 58 which is located at magazine storage station 32. Therefore, the particular disc D located within the magazine compartment positioned at the disc storage station can be readily removed by one of the transfer carriages without being obstructed by plate member 55. The plate member prevents all of the other discs from inadvertently falling out of or from otherwise being removed from their respective magazine compartments.

Still referring to overall magazine assembly 40, as shown in FIGS. 7 and 8, an electromagnetic solenoid valve 56 is mounted directly behind magazine path 20 at disc storage station 32 by suitable means 61. This electromagnetic solenoid valve is controlled by the master computer so that its actuating rod 59 moves between a deenergized retracted position shown by solid lines in FIG. 7 and an extended position (shown by dotted lines). As will be seen hereinafter, in order for the transfer carriages to pick up the disc located in a magazine compartment at the disc storage station, the disc must be first partially ejected forward a small amount from its compartment. As shown in FIG. 7, by energizing solenoid 56, its actuating rod 58 pushes the disc forward from its solid line position to its dotted line position.

Having described the essential components making up magazine assembly 40, attention is now directed to detailed discussion of transfer arrangement 16 which is shown in more detail in FIGS. 9 and 10, except for the details of transfer carriages 26 and 28 which will be specifically described hereinafter in conjunction with FIGS. 13-18. Referring to FIGS. 9 and 10, transfer arrangement 16 is shown including previously recited transfer arm 24 and carriages 26 and 28. The transfer arm is mounted for rotation around the previously recited circular transfer path 30 by means of a rod 60 which is mounted about its own axis at one end to a fixed reference by suitable bearing means 62. Transfer arm 24 is fixedly connected for rotation about and to the rod and the latter is rotated by means of a reversible drive motor 62 connected to the otherwise free end of the rod through a series of interconnecting means including motor shaft gear 64, endless belt 66, and gear 68 fixedly connected to the free end of rod 60. While not shown, motor 62 is suitable wired to receive instructions from the master computer for rotating rod 60 in a controlled way in order to rotate drive arm in the manner necessary to perform its intended function for transferring discs between magazine 12 and drive unit 14 as described above.

Still referring to FIGS. 9 and 10, each of the transfer carriages 26 and 28 is mounted for rotation with transfer arm 24 by means of a shaft extending through the transfer arm. A cooperating gear connected to the rotatable shaft on the opposite side of the transfer arm. The shaft and cooperating gear for supporting carriage 26 are indicated at 70 and 72 and the shaft and cooperating gear for supporting carriage 28 are indicated at 74 and 76. Note that the two gears 72 and 76 are located near opposite ends of the transfer arm. For reasons to be discussed hereinafter, each of the gears 72, 76 and its associated shafts 70, 74 are connected to their associated carriage 26, 28 through a one-way clutch 77, 79 much that rotation of each gear 72, 76 causes its carriage to rotate with it, but the cooperating clutch prevents the carriage from rotating when the gear rotates in the opposite direction.

In addition to the gears thus far described, the transfer arm itself is located directly behind a fixed gear 78 identical in size to gears 72 and 76 and located in front of the transfer arm so that its center coincides with the transfer arms center of rotation. Fixed gear 78 is supported in this position by suitable means, for example fixed support frame 81. Disposed between the fixed gear 78 and gears 72 and 76 are two smaller, intermediate gears 80 and 82 which are mounted for free rotation to the transfer arm and which engage the gears 72, 76 and 78. The entire reason for this arrangement of gears is to be able to control the way in which carriages 26 and 28 rotate relative to the transfer arm and fixed reference 84 in order to insure that the carriages either remain vertical, as previously described with respect to FIG. 4, or rotated 180° as described previously with respect to FIG. 5.

Turning now to FIGS. 11 and 12, attention is directed to the way in which the arrangement of gears just described cooperates to move carriages 26 and 28 in a desired way as the carriages move about transfer path 30 between storage station 32 and disc drive station 34. Referring to FIG. 11, it will be assumed that the carriages 26 and 28 are to be moved between stations 32 and 34 while remaining vertical so that the discs carried by the carriages do not flip 180°. To accomplish this, the transfer arm 24 is rotated clockwise, as viewed in FIG. 11. Because center gear 78 does not rotate, intermediate gears 80 and 82 are caused to rotate clockwise. This, in turn, causes the gears 72 and 76 to rotate counterclockwise, causing the carriages 26 and 28 to rotate with them, which the carriages are able to do. Moreover, since the gears 72 and 76 are the same size as fixed gear 78, as transfer arm 24 rotates through 180°, the gear 72 and 76 and their corresponding carriages 26 and 28, respectively, will also rotate through 180° but in the opposite direction. Therefore, as the two carriages move clockwise 180° around path 30 with arm 24 they rotate counterclockwise 180° relative to the transfer arm so as to remain vertical with respect to stationary point 84 and therefore with respect to the vertically extending compartments forming part of magazine 12 and disc drive 14.

Turning now to FIG. 12, attention is directed to the way in which the arrangement of gears forming part of the transfer arrangement functions to rotate or "flip" the transfer carriages 180° as they move between the disc storage and drive stations 32 and 34. In order to understand the way this happens, it is important to remember that gears 72 and 76 can cause carriages 26 and 28 to rotate counterclockwise only and not clockwise. With this in mind, to move the carriages between stations while flipping them 180°, the transfer arm is rotated counterclockwise as viewed in FIG. 12, rather than clockwise. Since gear 78 is fixed, this causes intermediate gears 80 and 82 to rotate counterclockwise and gears 72 and 76 to rotate clockwise. Since one-way clutches 77 and 79 prevent carriages 26 and 28 from rotating clockwise, the carriages cannot rotate relative to the transfer arm and therefore flip 180° as the transfer arm moves through 180°.

In the description immediately above, it should be apparent that transfer arrangement 16 includes a series of gears that allow carriages 26 and 28 to either remain vertical or flip 180° depending on whether or not transfer arm 24 is moved clockwise or counterclockwise. Thus, it is only necessary for the master computer to instruct motor 62 to rotate in one direction or the other, depending upon whether one side of a disc or the other is to be acted upon by read/write head 22 forming part of disc drive 14. The arrangement of gears automatically do the rest. While this arrangement forms part of an actual working embodiment of apparatus 10, it is to be understood that the present invention is not limited to that particular approach. More specifically, the carriages 26 and 28 could be supported on a suitable transfer mechanism in order to move between the storage and drive stations using other suitable means to flip them, if this is required.

Having described overall transfer arrangement 16, except for the details of its transfer carriages 26 and 28, attention is now directed to the essential components making up one of the transfer carriages, for example, transfer carriage 26 which is substantially identical to transfer carriage 28. Carriage 26 is shown in FIGS. 13-15 including an overall carriage frame 90 for supporting an information containing disc during movement of the carriage between storage station 32 and drive station 34. The carriage arm 92 is mounted within frame 90 for back and forth movement between a disc pickup point at the left hand end of the frame, as viewed in FIG. 13, and a disc support point at the right hand end of the frame. An arrangement 96, to be described below especially in conjunction with FIG. 14, is provided for moving the carriage arm between these extreme positions in a controlled manner which is dictated by, for example, the master computer. As will also be described below, the carriage arm carries with it a pair of disc engaging mechanisms 94 which serve to engage a disc D in either its magazine compartment or disc drive so that the carriage arm can pull the disc into frame 90. These mechanisms 94 also serve to release the disc when returning it to either the magazine compartment or the disc drive.

Referring specifically to FIG. 15, carriage arm 92 is shown including two separate segments, an essentially C shaped (in reverse) outer segment 92A and a smaller box shaped segment 92B which are movable in a controlled way and to a limited extent relative to one another in a manner and for the reason to be described below. The disc engaging mechanisms 94 are located above and below segment 92B. The upper mechanism 94 includes a rack 96 in the top of segment 92B and a cooperating pinion 98 rotatably mounted to the top of segment 92A and engaging rack 96. A generally U shaped disc engaging finger 100 also forming part of the upper disc engaging mechanism is fixedly connected to pinion 98. A similar rack and pinion arrangement and U shaped finger form lower disc engaging mechanism 94 at the bottom of segments 92A and 92B.

As will be described below, throughout most of the movement of carriage arm 92 within frame 90 between its disc pickup/delivery point and disc support point, the two segments 92A and 92B move together. They are interconnected to one another by suitable spring means diagrammatically indicated at 101 in FIG. 15 so as to remain together throughout this movement. As a result, the pinions 96 forming part of disc engaging mechanisms 94 remain stationary and the upper and lower disc engaging fingers remain thoroughly horizontal, as illustrated in solid lines in FIG. 15. However, as the carriage arm approaches its disc pickup/delivery point from its disc support point, segment 92A engages a stop 102 fixedly supported on the frame while segment 92B which is connected directly to drive arrangement 96 (as will be seen) moves forward a limited extent against the forces of spring means 101. This causes the upper and lower racks 96 to move forward, thereby causing upper pinion 98 to rotate clockwise and lower pinion 98 to rotate counterclockwise. As a result, the upper and lower disc engaging fingers pivot from their generally horizontal positions outward to their dotted line positions. As the carriage arm is moved back toward its disc support point, spring means 101 causes segment 92B to return to its initial spring biased position adjacent segment 92A causing the disc engaging fingers 100 to return to their horizontal positions. As will be seen hereinafter in conjunction with FIGS. 16-18, this overall operation of transfer arm 92 allows fingers 100 to engage the disc in either a storage compartment or the disc drive and pull it into frame 90 or move a disc from frame 90 and into either a storage compartment or the disc drive.

Returning to FIG. 13 in conjunction with FIGS. 14 and 15, attention is now directed to drive arrangement 96, which, as stated previously, serves to move carriage 92 in a controlled manner between its pickup/delivery point and its disc storage point. This arrangement includes upper and lower horizontally extending endless belt disposed within frame 90. Each is supported at opposite ends to rollers 106, one of which is driven by a single reversible drive motor 108 through a series of gears and a drive belt, generally indicated at 110. While not shown, the drive motor is controlled through, for example, the master computer for controlling movement of the endless belts. The entire carriage arm 92 is fixedly connected to one side of each of the endless belts 104 for movement with the belts, with a direct connection between the belt and segment 92B. Two side rails 112 along which the carriage arm moves are disposed between the belts and serve to guide the carriage arm through its movement. As stated above when carriage arm 92 approaches its pickup/delivery, the segment 92A engages stop 102. However, the endless belt continues to move segment 92B forward a small distance relative to 92A before the entire carriage arm comes to a stop. During this last increment of movement, the disc engaging fingers 100 are caused to move outward in their generally horizontal positions. As will be seen immediately below, this allows the carriage arm to engage and disengage the cooperating disc.

Turning now to FIG. 16 to 18, attention is directed to the way in which carriage arm picks up the disc D located within a magazine compartment and pulls that disc into its cooperating frame 90. FIG. 16 illustrates the disc within its magazine compartment before being ejected a slight distance forward (for example ¾" by means of the previously described cooperating solenoid 56. The carriage arm 92 is shown moving toward the disc. In actuality, only the segment 92B of the carriage arm and disc engaging mechanisms 94 are shown. Before the carriage arm actually approaches its disc pickup/delivery point, solenoid 56 ejects the disc to a more forward position, as illustrated by dotted lines in FIG. 16 and solid lines in FIG. 17. At that time or slightly thereafter, the carriage arm begins to approach the pickup/delivery point, engaging stop and thereby causing segment 92B to move forward a small increment (for example ¾") which, in turn, causes fingers 100 to move outward. This allows them to rise above and fall below the upper and lower edges of the disc. As seen in FIG. 17, the outermost ends of the fingers are now positioned directly over the previously described slots 54. As the carriage arm begins to move back toward its disc support point, segment 92B is caused to move back to its position adjacent segment 92A by spring means 101, thereby causing the disc engaging fingers to move back to their horizontal positions and into slots 54. As a result, as the carriage arm 92 moves back into its frame, it pulls the disc with it. The carriage arm picks up a disc from the drive unit 14 in the same way. In this regard, a standard disc drive includes means for automatically ejecting its disc in the same way as solenoid 56 ejects a disc from magazine 12.

The carriage arm delivers a disc back to the magazine compartment or to the disc drive by moving back toward the pickup/delivery point and pushing the disc with it. As the disc enters the magazine or disc drive, segment 92A of carriage arm 92 again engages stop 102, causing segment 92B to move forward relative to segment 92A. During this movement, segment 92B pushes the disc entirely within the awaiting magazine compartment of disc drive and causes the disc engaging fingers to move outward in the manner described, thereby releasing the disc and allowing the carriage arm to move back to its frame.

The foregoing has been a description of the essential components making up overall apparatus 10 and the way in which the apparatus functions to transfer discs between disc storage magazine 12 and drive 14. It is to be understood that the overall apparatus includes other, readily providable components which do not per se form part of the present invention. These other components may include, for example, the master computer referred to above, necessary circuitry, software and interfaces between the computer and hardware making up the apparatus in order to allow it to function in the manner described.

While overall apparatus 10 has been described including a single disc storage station and a single disc drive, it could include at least two disc drives and corresponding disc storage stations. For example, a second disc storage station could be located adjacent station 32 on magazine path 20 and also on transfer path 30, as indicated generally at 32' in FIG. 1, while the second disc drive could be adjacent disc drive 14 and its associated disc drive station, as indicated by dotted lines at 14' in the same figure. In the case of the second disc storage station, theoretically, it would not be possible to have a second storage station line up precisely with the first storage station and be both on straight line path 20 and circular path 30. However, there is sufficient tolerance in the overall system to allow for this. Further, while overall apparatus 10 has been described as having a magazine that moves along a straight line path, it is possible for the magazine assembly to be designed for movement about, for example, a circular path as seen in FIG. 19 at 12'.

What is claimed is:
1. An apparatus for storing and retrieving information containing discs, comprising:
   (a) a disc storage magazine for storing a plurality of said information containing discs in individual compartments, said magazine being movable along a predetermined path including a specific disc storage station such that each of said individual compartments is positionable within said disc storage station;
   (b) means for moving said magazine along said predetermined path;
   (c) means including a disc drive for storing information on and retrieving information from said discs, said disc drive being located at a disc drive station spaced from said disc storage station;
   (d) means for transferring an information containing disc between said drive at said disc drive station and one of said magazine compartments when the latter is at said disc storage station, said transferring means including
      (i) a transfer arm mounted for rotation about an axis perpendicular to the transfer arm and through its center such that the ends of said arm move along a common circular transfer path through both said storage station and said drive station,
      (ii) carriage means located at each end of said transfer arm for retrieving an information containing disc at either one of said storage or drive stations and for delivering it to the other station by rotating said transfer arm in a controlled way, and (iii) means for rotating said transfer arm in said controlled way so as to cause said carriage means at each end of the arm to move along said circular transfer path between said storage and transfer stations; and (e) means for controlling the movement of said magazine along its predetermined path and for controlling said transferring means for transferring specific information containing discs between said magazine and drive.

2. An apparatus according to claim 1 wherein said transferring means is configured to transfer a disc from the magazine compartment at said storage station to said drive while simultaneously transferring a disc from said drive to said last-mentioned compartment.

3. An apparatus according to claim 1 wherein said predetermined path is a straight-line path and wherein said magazine compartments are disposed adjacent one another in a straight line along a section of said path.

4. An apparatus according to claim 3 including means for preventing discs within said magazine compartment from being removed from the compartment, except at said disc storage station.

5. An apparatus according to claim 3 wherein said means for moving said magazine includes a power driven endless belt connected along a section thereof to said magazine.

6. An apparatus according to claim 3 wherein said magazine compartments have front and back ends and wherein said transferring means includes located adjacent said storage station behind a magazine compartment located there for partially ejecting a disc in that compartment out its front end in preparation for transfer to said drive station.

7. An apparatus according to claim 1 wherein said transferring means includes means for moving a disc from a compartment at said storage station to said drive so as to place either side of said disc adjacent a given side of said drive, whereby information can be stored on and retrieved from either side of a two-sided disc using a drive having one sided storage and retrieval capabilities.

8. An apparatus according to claim 1 wherein said means for controlling the movement of said magazine and said transfer means causes the latter to transfer a disc from said storage station to said drive station while simultaneously transferring a disc from said drive station to said storage station.

9. An apparatus according to claim 1 wherein each of said carriage means is mounted to its corresponding end of said transfer arm for rotation about an axis parallel to the axis of rotation of said transfer arm and wherein said transferring means includes means for controlling the rotation of each of said carriage means about its respective axis such that a disc can be moved from its magazine compartment at said storage station to said drive so as to place either side of that disc adjacent a given side of said drive, whereby information can be stored on and retrieved from either side of a two-sided disc using a drive having one sided storage and retrieval capabilities.

10. An apparatus according to claim 9 wherein said magazine compartment at said storage station and said disc drive are vertically oriented and wherein means for controlling the rotation of said carriage means includes rotating means for causing each carriage to support its disc in a vertical orientation throughout the carriage's movement along said circular transfer path between the disc storage station and drive station or, alternatively, for causing each carriage to rotate its disc 180° as the carriage moves between said stations on said circular path.

11. An apparatus according to claim 10 wherein said rotating means includes an arrangement of interconnected gears driven by said transfer arm rotating means for controlling the rotation of said carriage means.

12. An apparatus according to claim 11 wherein said arrangement of gears are configured such that rotation of said transfer arm in one direction about its axis of rotation causes the discs in said carriage means to remain vertical as they move between said storage and drive stations and such that rotation of said transfer arm in the opposite direction about its axis of rotation causes the discs in said carriage means to rotate 180° as they move between said stations.

13. An apparatus according to claim 1 wherein said transferring means includes a carriage and means for moving said carriage between said storage and drive stations, said carriage including
(a) a carriage frame for supporting one of said discs during movement between said stations,
(b) a carriage arm including a disc engaging mechanism mounted for back and forth movement between a disc pickup/delivery part and a disc support point along a fixed path within said frame, said disc engaging mechanism being operable in a controlled way for either engaging or releasing a disc,
(c) means for moving said carriage arm within said frame between said pickup/delivery and support points in a controlled way, and
(d) means for operating said disc engaging mechanism in a controlled way for either engaging a disc or releasing it at one of said stations when said carriage arm is at its pickup/delivery point.

14. An apparatus according to claim 13 wherein said disc engaging mechanism includes a disc engaging finger movable between a disc engaging position and a disc releasing position, and wherein said means for operating said disc engaging mechanism in said controlled way includes means for moving said disc engaging finger between its disc engaging and releasing positions.

15. An apparatus according to claim 14 wherein said means for moving said disc engaging finger includes a rack and pinion, cooperating with one another such that translation of said rack in a predetermined way causes said pinion to rotate in a predetermined way, said pinion being connected with said disc engaging finger such that rotation of said pinion in said predetermined way causes said finger to move between its disc engaging and releasing positions.

16. An apparatus according to claim 15 wherein said carriage arm include first and second segments, respectively supporting said pinion for rotation and said rack for translation, said first and second segments of said carriage arm being movable in a controlled way and to a limited extent relative to one another so as to cause said pinion to rotate in said predetermined way.

17. An apparatus according to claim 16 wherein said transferring means includes means for causing said carriage arm segments to move relative to one another in said predetermined way as the carriage arm approaches and initially leaves its pickup/delivery point.

18. An apparatus according to claim 1 including a plurality of disc storage stations on said path of movement of said magazine and an equal plurality of disc drives and adjacent disc drive stations, whereby said transferring means is able to transfer discs between any given storage station and one of said drive station.

19. An apparatus according to claim 1 wherein said predetermined path is a circular path and wherein said magazine compartments are disposed adjacent one another along at least a section of said path.

20. An apparatus for storing and retrieving information containing discs, comprising:
    (a) a disc storage magazine for storing a plurality of said information containing discs in individual compartments disposed adjacent to one another in a straight line along a section of a predetermined straight line path which extends through a specific disc storage station, said magazine being movable along said straight line path such that each of said individual compartments is positionable within said disc storage station;
    (b) means for moving said magazine along said predetermined straight line path;
    (c) means including a disc drive for storing information on and retrieving information from said discs, said disc drive being located at a disc drive station spaced from said disc storage station;
    (d) means for transferring an information containing disc between said drive and said disc drive station and one of said magazine compartments when the latter is at said disc storage station along an arcuate path extending between said storage and drive station, said transferring means including
        (i) a transfer arm mounted for rotation about an axis perpendicular to the transfer arm and through its center such that the ends of said arm move along a common circular transfer path including said arcuate path and therefore through said storage and drive stations,
        (ii) carriage means located at each end of transfer arm for retrieving an information containing disc at either one of said storage and drive stations and for delivering it to the other station by rotating said transfer arm in a controlled way, and
        (iii) means for rotating said transfer arm in said controlled way so as to cause said carriage means at each end of the arm to move along said circular path between said storage and transfer stations; and
    (e) means for controlling the movement of said magazine along straight line path and for controlling said transferring means for transferring specific information containing discs between said storage and drive stations along said arcuate path.

21. An apparatus according to claim 20 wherein said transferring means is configured to transfer a disc from the magazine compartment at said storage station to said drive station while simultaneously transferring a disc from said drive station to said storage station.

22. An apparatus according to claim 21 wherein aid transferring means includes means for moving a disc from a compartment at said storage station to said drive so as to alternatively place either side of said disc adjacent a given side of said drive, whereby information can be stored on and retrieved from either side of a two sided disc using a drive having one sided storage and retrieval capabilities.

23. An apparatus according to claim 22 wherein each of said carriage means is mounted to its corresponding end of said transfer arm for rotation about an axis parallel to the axis of rotation of said transfer arm and wherein said transferring means includes means for controlling the rotation of each of said carriage means about its axis such that a disc can be moved from its magazine compartment at said storage station to said drive so as to place either side of that disc adjacent a given side of said drive, whereby information can be stored on and retrieved from either side of a two-sided disc using a drive having one sided storage and retrieval capabilities.

24. An apparatus according to claim 23 wherein said magazine compartments and said disc drive are vertically oriented and wherein said means for controlling the rotation of said carriage means includes rotating means for causing each carriage to support its disc in a vertical orientation throughout the carriages movement on said circular transfer path between the disc storage stations and drive stations, or alternatively, for causing each carriage to rotate its disc 180° as the carriage moves between said stations on said circular path.

25. An apparatus according to claim 24 wherein said rotating means includes an arrangement of interconnected gears driven by said transfer arm rotating means for controlling the rotation of said carriage means.

26. An apparatus according to claim 20 including two disc storage stations on said straight line path of movement along said magazine and also on said arcuate path, and two disc drives and adjacent disc drive stations on said arcuate path, said transferring means being configured to transfer information containing discs between both of said storage and drive stations.

27. A method of storing and retrieving information containing discs, comprising the steps of:
    (a) storing a plurality of said information containing disc in individual compartments forming part of an overall disc storage magazine which is movable along a predetermined path which passes through a specific disc storage station such that each of said individual compartments is positionable within said disc storage station;
    (b) providing a disc drive for storing information on and retrieving information from said discs at a disc drive station spaced from said disc storage station;
    (c) moving said storage magazine in a controlled way so as to place a desired magazine compartment containing a specific disc at said disc storage station;
    (d) transferring the disc in the magazine compartment at said disc storage station to said disc drive at said disc drive station; and
    (e) transferring a disc from said disc drive at said disc drive station, if one is there, to said magazine compartment at said storage station at the same time as the disc is being transferred from the magazine compartment at said storage station to said disc drive, said discs being simultaneously transferred between said magazine compartment at said storage station and said disc drive along a common circular path.

28. A method according to claim 27 wherein said storage magazine is moved along a straight line path.

29. A method according to claim 27 wherein said storage magazine is moved along a circular path.

30. A method according to claim 27 wherein said discs are transferred between said disc storage and disc drive stations within carriage means supported on opposite ends of a transfer arm.

* * * * *